United States Patent [19]
Beringhause et al.

[11] Patent Number: 5,412,986
[45] Date of Patent: May 9, 1995

[54] ACCELEROMETER WITH IMPROVED STRAIN GAUGE SENSING MEANS

[75] Inventors: Steven Beringhause, N. Attleboro; W. Donald Rolph, III, E. Walpole, both of Mass.; Raymond E. Mandeville, Cumberland, R.I.; Siegbert Hartauer, Landshut; Vaclav F. Vilimek, Vlecht, both of Germany

[73] Assignee: Texas Instruments Incorporated, Dallas, Tex.

[21] Appl. No.: 631,563

[22] Filed: Dec. 21, 1990

[51] Int. Cl.⁶ ............................................. G01D 15/12
[52] U.S. Cl. ...................................... 73/517 R; 338/2
[58] Field of Search ...................... 73/517 R; 338/2, 5

[56] References Cited

U.S. PATENT DOCUMENTS

| 3,327,270 | 6/1967 | Garrison | 338/5 |
| 3,805,377 | 4/1974 | Talmo et al. | 338/2 |
| 4,488,445 | 12/1984 | Aske | 73/517 R |
| 4,553,436 | 11/1985 | Hansson | 73/517 R |
| 4,691,568 | 9/1987 | Rendek | 73/517 R |
| 4,967,605 | 11/1990 | Okada | 73/517 R |

FOREIGN PATENT DOCUMENTS

| 0368446 | 5/1990 | European Pat. Off. . |
| 3740688 | 6/1989 | Germany . |
| 1300118 | 12/1972 | United Kingdom . |

OTHER PUBLICATIONS

"A Miniature Silicon Accelerometer With Built–In Damping," Stephen Terry, IC Sensors, pp. 1–3.
Electronic Engineering, "Silcon Strain Gauge Technology in Aerospace Applications", R. M. Whittier, vol. 53, No. 659, Nov. 1981, London GB, pp. 151–157.

Primary Examiner—John E. Chapman
Attorney, Agent, or Firm—Russell E. Baumann; Richard L. Donaldson; René E. Grossman

[57] ABSTRACT

An accelerometer device comprises a silicon semiconductor member having a mass mounted on a support by integral beams extending between the mass and support to permit movement of the mass in response to acceleration. Piezoresistive sensors are accommodated in the beams for sensing strain in the beams during movement of the mass to provide an output signal from the device corresponding to the acceleration. The beams each have an end secured to the support and an end secured to the mass and taper intermediate the beam ends to provide a high and substantially uniform strain throughout the tapered section of the beam. The piezoresistive sensor is accommodated in the tapered beam section to be responsive to that high, uniform strain. Preferably the member has four beams mounting the mass, each beam has a tapered section extending from each end of the beam toward the center of the beam, and each beam section has a piezoresistive sensor accommodated therein to be responsive to the uniform strain within that beam section. The piezoresistive sensors are conveniently interconnected to compensate for off-axis acceleration in one direction by compensation within each leg of a bridge circuit and to compensate for off-axis acceleration in another direction by compensation within the full bridge circuit.

11 Claims, 3 Drawing Sheets

ACCELEROMETER WITH IMPROVED STRAIN GAUGE SENSING MEANS

BACKGROUND OF THE INVENTION

The field of this invention is that of accelerometers, and the invention relates more particularly to silicon accelerometers incorporating piezoresistive sensing means.

Certain known silicon accelerometers comprise a silicon semiconductor member mounted on a base, the member having a mass mounted on a support by integral beams extending between the support and mass to permit movement of the mass relative to the base in response to an acceleration force. Portions of the semiconductor beam materials are doped to form piezoresistive sensors within the beams for sensing strain in the beams during movement of the mass to provide an output signal from the device corresponding to the acceleration. The sensors are interconnected in a bridge circuit to provide reduction in device sensitivity to off-axis accelerations. In such known accelerometers, the beams are arranged to permit selected movement of the mass in response to selected acceleration to provide the accelerometer with desired sensitivity to selected levels of acceleration force while also withstanding injury to the beams during application of the acceleration forces to the beams. It is desirable that there be substantial strain in the beams to be sensed by the piezoresistive means so that the sensor means provide an output signal of desired magnitude in response to the selected acceleration force levels. It would be desirable to improve sensitivity of the accelerometers while maintaining the desire ruggedness to withstand the acceleration forces.

In that regard, it is now recognized that the strains established in the beams in known accelerometers vary along the lengths of the beams and that the piezoresistive sensors have selected lengths extending along sections of the beams so that the sensors typically respond to the average strain in the beam sections occupied by the sensors rather than to the maximum strain levels in the beams. There also tends to be some variation in location of the sensors relative to portions of the beams having different strain levels therein during accelerometer manufacture so that the sensors may not be exposed to the highest or lowest strains in each of the beams in a uniform manner, thereby resulting in loss of uniformity of device performance and sensitivity from device to device during manufacture. Further, it is sometimes difficult to interconnect the sensors with convenient interconnection patterns to achieve desired reduction of device sensitivity to off-axis acceleration forces.

BRIEF SUMMARY OF THE INVENTION

It is an object of the invention to provide a novel and improved accelerometer; to provide such an accelerometer which displays improved sensitivity while providing a desired degree of ruggedness in withstanding acceleration forces; to provide such devices in which the sensors are interconnected in a convenient manner to compensate for off-axis accelerations; to provide such accelerometers which are of inexpensive manufacture; and to provide such devices which are adapted to be manufactured with substantial uniformity from device to device.

Briefly described, the novel and improved accelerometer device of the invention comprises a semiconductor member of a silicon material or the like. One portion of the member comprises a mass which is supported within a opening in a preferably rectangular frame or support portion of the member by at least one and preferably a plurality of integral member beams, thereby to permit movement of the mass relative to the support in response to acceleration of the member. The member is formed primarily of a semiconductor material of one conductivity type, and piezoresistive sensors comprising semiconductor material of a second conductivity type are accommodated within the beams for sensing strain established in the beams during movement of the mass to provide an output signal corresponding to the member acceleration. In accordance with the invention, each beam has an end secured to the support and an end secured to the mass and has a section of the beam which is tapered to provide the beam section with a high and substantially uniform strain throughout the beam section when the mass moves in response to selected member acceleration. Preferably for example, each beam has two tapered sections tapering from wider beam parts at the respective beam ends to a narrow beam part nearer the center of the beam. The width of the wider part of each beam section is selected so that the beam material is adapted to withstand the highest strains which are typically encountered in the beam materials at the beam ends where the beams are secured to the relatively larger and stiffer support and mass portions of the semiconductor member. The taper and narrower width of each beam section at the end of the taper is selected so that the beam material is subjected to substantially the same high strain in the beam material throughout the length of the tapered beam section during movement of the mass with the selected acceleration. The narrower part of the beam is also selected to assure that the strain limits of the beam materials are not exceeded, thereby to also protect the narrow beam part from injury or damage. The piezoresistive sensors are then located within the beam sections to be responsive to those high and uniform beam strains. In that way, the accelerometer beams are adapted to withstand selected acceleration forces without excessive strain in any portion of the beams while the piezoresistive sensors are also adapted to be responsive to higher strain levels for selected accelerations, whereby the accelerometer is adapted to display improved sensitivity. The piezoresistive sensors are interconnected using conventioned techniques with novel interconnection paths for permitting the interconnection to effect reduction in response of the device to off-axis acceleration forces while also permitting the paths to be formed and accommodated with improved convenience in the devices.

DESCRIPTION OF THE DRAWINGS

Other objects, advantages and details of the novel and improved accelerometer of the invention appear in the following detailed description of the preferred embodiments of the invention, the detailed description referring to the drawings in which.

DESCRIPTION OF THE PREFERRED EMBODIMENTS

Figure 1:
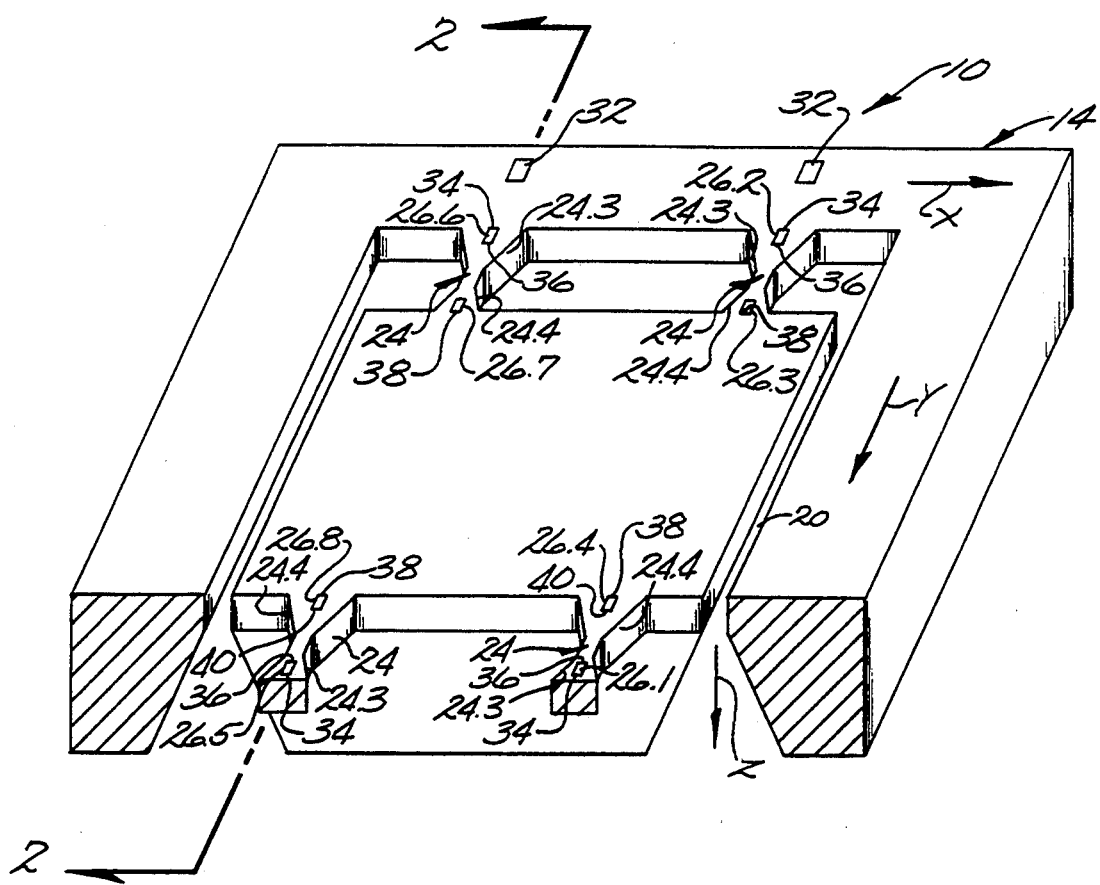
FIG. 1 is a partial perspective view to enlarged scale of the novel accelerometer of the invention.
Figure 2:
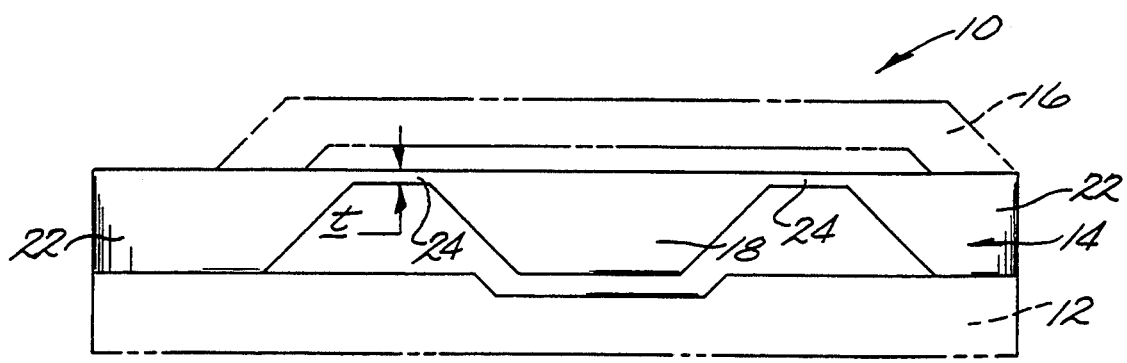
FIG. 2 is a section view along line 2—2 of FIG. 1.

Referring to the drawing, 10 in FIGS. 1-2 indicates the novel and improved accelerometer device of the invention. The device preferably includes a base 12 of a strong, rigid material such as glass or silicon or the like and a semiconductor member 14 formed of a silicon semiconductor material or the like is mounted on the base in any conventional manner. If desired, a cover 16 is secured to the member to provide an environmental seal for the device.

One portion 18 of the semiconductor member serves as a seismic mass or the like which is supported within an opening 20 in a preferably rectangular frame or support portion 22 of the member by at least one, and preferably by a plurality of, integral member beams 24 to permit movement of the mass 18 relative to the support 22 and base 12 in response to acceleration of the device 10.

The semiconductor member 14 is primarily formed of the silicon semiconductor material of one conductivity type and portions 26.1-26.8 of the beam materials are doped to provide silicon materials of a second conductivity type to provide piezoresistive sensor means in the beam which are adapted to sense strain in the beam materials to provide an output signal from the device corresponding to the member acceleration in well known manner.

Figure 3:
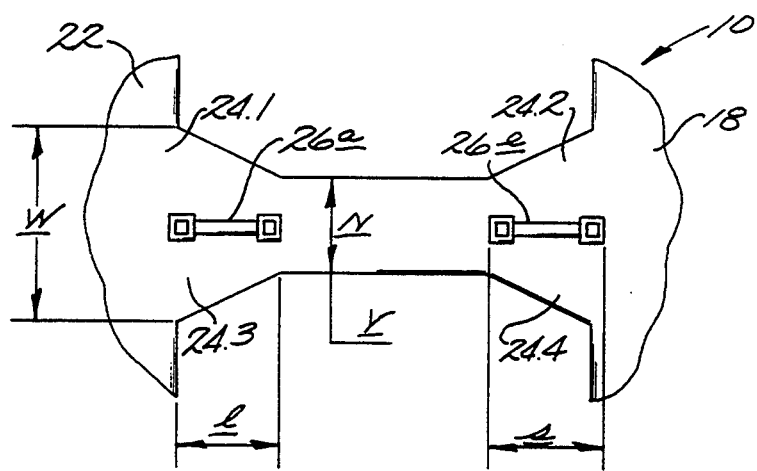
FIG. 3 is an enlarged partial plan view of a portion of the accelerometer of FIG. 1.

In accordance with the invention, the beams 24 of the member are provided with a selected configuration as shown particularly in FIG. 3 and the proportions of the beams are located with respect to the piezoresistive sensors 26.1-26.8 to provide improved device sensitivity. That is, the beams are preferably provided with a thickness t substantially less than the thickness of the mass 18 and support 22 (see FIG. 2) so that the mass is adapted to move toward the base 12 in response to acceleration of the device 10 in a selected direction along a Z axis to develop a high strain in the beam materials at the ends 24.1, 24.2 of the beam where the beams are secured to the relatively thicker and stiffer support and mass portions of the member. The beams are also provided with tapered beam sections 24.3, 24.4 as shown so that strain in the beam material is substantially uniform throughout the length of the tapered beam section. As the semiconductor material is characterized by high uniformity, this taper also provides substantially uniform unit stress in the beam material through the tapered beam section. Preferably each beam is provided with two tapered sections each of which is adapted to be subjected to substantially uniform unit strain in the beam material in response to device acceleration. Preferably the wider portions w of the beams at the ends of the beams are selected with respect to the beam thickness so that the beam material is subjected to a sufficiently high strain at the ends of the beams for permitting the piezoresistive sensor 26 to respond to that high strain with an output signal of desired magnitude, the widths w also being selected so that the beams are not fractured at the beam ends when those high strains are established in the beam materials at those locations during device acceleration. The length l and the width of the narrower portions n of the tapered beam sections located at or adjacent to the centers of the beams are selected so that the beam material throughout each tapered beam section is subjected uniformly to the same high strain so that the strain limits of the beam materials are not exceeded at the narrow beam locations during device acceleration, and so that the narrow width n of the tapered beam sections are also able to withstand the applied acceleration forces without fracture.

The piezoresistive sensors 26.1-26.8 are provided in each of the beams 22 at locations within the respective tapered beam sections 24.3, 24.4 as shown particularly in FIG. 3 so that the lengths s of the sensor materials are subjected to the same high and substantially uniform strain in the beam materials throughout the tapered beam sections and are therefore adapted to provide an output signal corresponding to high, and preferably to the highest, strains established in the beam materials, whereby the accelerometer device is adapted to display very high sensitivity while also being adapted to withstand substantial acceleration forces without damage or injury. The location of the piezoresistive means 26.1-26.8 are preferably regulated to be fully within the tapered beam sections 24.3, 24.4 to be exposed to the uniform strain and so that no part of any piezoresistive sensor is permitted to extend outside the section of uniform strain where it might be subjected to different strain. In that way the accelerometers are adapted to be manufactured with improved uniformity of performance from device to device.

As silicon acceleration are well known as shown in U.S. Pat. No. 4,553,436 for example, the disclosure of which is incorporated herein by this reference, the general structure of the accelerometer 10 is not further described and it will be understood that the semiconductor member 14 is formed of a silicon semiconductor material of one conductivity type, the piezoresistive sensors are formed of a semiconductor material of a second conductivity type formed in situ in the member, and circuit path conductors are formed in any conventional manner to interconnect the piezoresistive sensors in any conventional manner and to permit lead-in of electrical power from input terminal pads 30 to the sensors and lead out of an output signal from the sensors via output terminals 32. (See FIGS. 3 and 5.) Stop means of any conventional type such as portions of the device cover or base or separate stop elements or the like are incorporated in the devices to limit movement of the mass 18 when the device is exposed to excessive acceleration forces, and the stop means or other means are arranged close to the mass in any conventional way to provide conventional squeeze film damping of movement of the mass 18 in response to shock or vibration etc.

The piezoresistive sensors are also interconnected using any conventional techniques to provide a sensing circuit of any conventional type for producing an output signal from the sensors properly responsive to acceleration forces applied to the device 10. Preferably, the sensors are interconnected in a bridge circuit or the like to effect reduction in response of the device to acceleration forces which are off-axis from an acceleration force intended to be sensed with the device while also permitting circuit paths interconnecting the sensors and terminals to be conveniently formed and accommodated on the device in an improved manner.

Preferably as shown particularly in FIG. 1, four of the piezoresistive sensors 26.1, 26.2, 26.6 and 26.5, hereinafter referred to as support sensors, are disposed within respective tapered sections 24.3 of the beams adjacent to the support 22, each of the support sensors having a support end 34 adjacent the support 22 and an inner end 36 adjacent a central portion of a beam 24 and having a length extending along the lengths of the tapered beam section. Four other piezoresistive sensors 26.4, 26.3, 26.7 and 26.8 hereinafter referred to as mass sensors, are disposed within respective tapered beam sections 24.4, each of the mass sensors having a mass end adjacent the mass 18 and an inner end 40 adjacent a central portion of a beam 24 and having a length extending the length of the tapered beam section. A pair of conductor means 42 is arranged on a pair of beams 24 at one end 18.1 of the mass as shown in FIG. 5 to connect inner ends of respective pairs of sensors 26.6, 26.7 and 26.2, 26.3 to each other and to respective output terminals 32, reference numerals for the ends of the sensors being omitted from FIGS. 4 and 5 to clarify the illustrations. Another pair of conductor means 44 respectively connect mass ends of a pair of mass sensors 26.7, 26.3 at the end 18.1 of the mass to mass ends of a corresponding pair of mass sensors 26.8, 26.4 at an opposite end 18.2 of the mass. An additional pair of conductor means 46 extend along respective sides 18.3, 18.4 of the mass to respectively connect support ends of a pair of the support sensors 26.6, 26.2 at one end 18.1 of the mass to inner ends of the other pair of support sensors 26.5, 26.1 at the opposite end 18.2 of the mass. Respective conductor means 48 connect inner ends of the pairs of mass sensors 26.8, 26.4 on one of a pair of beams at the mass ends 18.2 to support ends of the pair of support sensors 26.5, 26.1 on the other beam of the pair of beams at the mass end 18.2. The conductor means 48 are also respectively connected to the input terminals 30. Where the crossover of conductor means is required as indicated at 49 in FIG. 5, the crossover is accomplished by conventional tunnel procedures or the like.

Figure 4A:
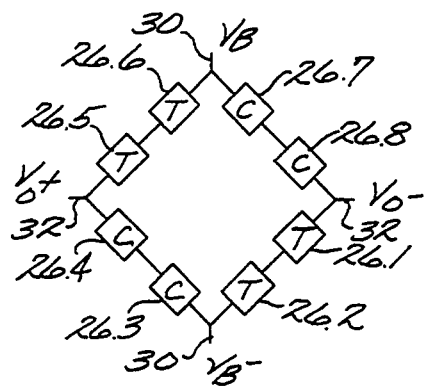
FIGS. 4A–4C are schematic views illustrating connection of sensors in the accelerometer of FIG. 1–3.
Figure 4B:
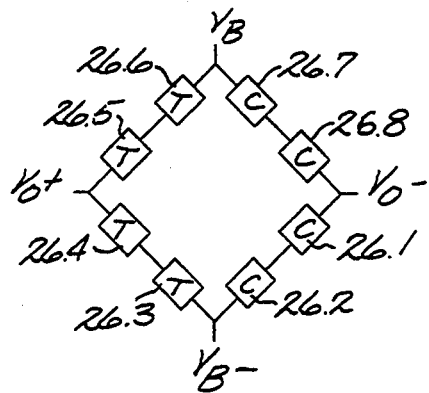
Figure 4C:
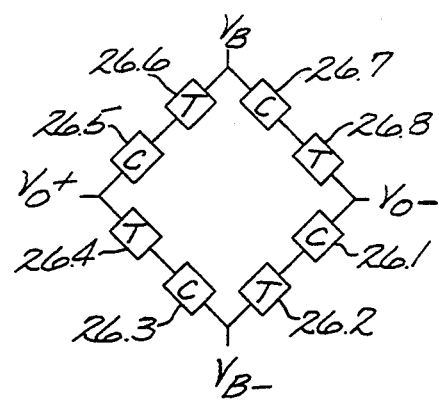
Figure 5:
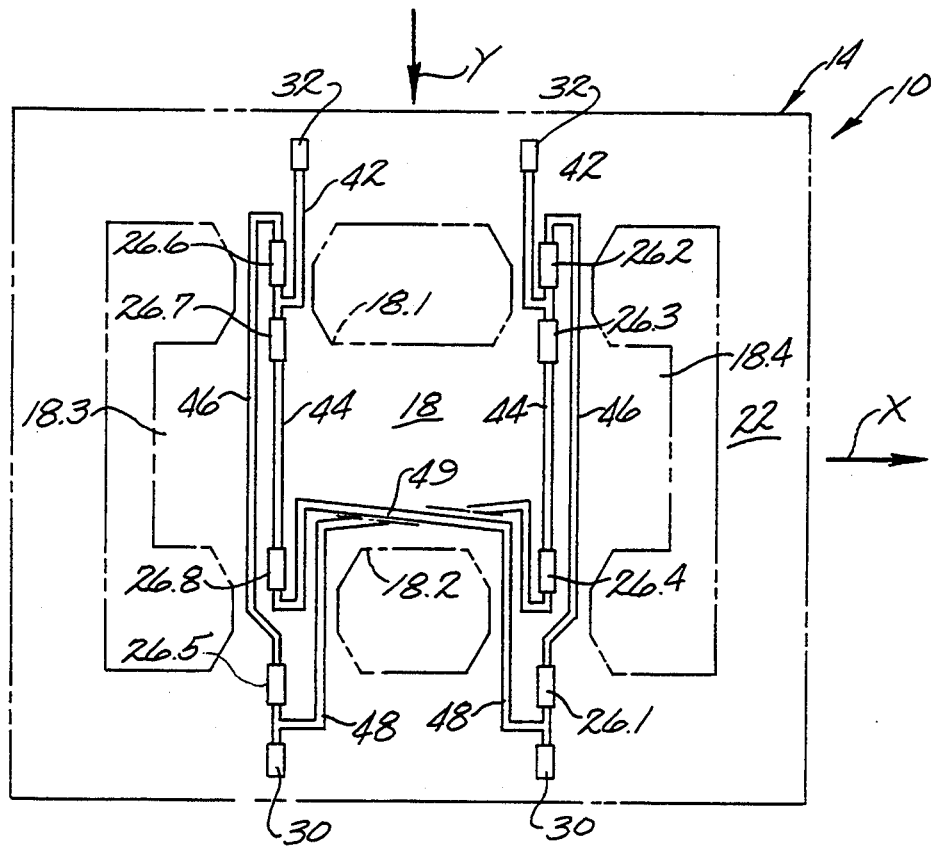
FIG. 5 is a diagrammatic view illustrating accommodation of the sensor interconnection paths on the device.

In that arrangement, the sensors 26.1–26.8 are interconnected in a four leg bridge circuit as shown in FIGS. 4A–4C with sensors 26.5, 26.6 in series in a first leg between a first input terminal 30 and a first output terminal 32, with sensors 26.4, 26.3 in series in a second leg between that first output terminal and the second input terminals 30, with sensors 26.2, 26.1 in series in a third leg between that second input terminal and the second output terminal 32, and with sensors 26.8, 26.7 in series in the fourth leg between that second output terminal and the first input terminal. Accordingly where the sensors are proportioned to provide equal resistance while the mass 18 is at rest, application of an input voltage $V_B$ across the input terminal 30 produces a zero output voltage $V_O$ across the output terminals 32 indicating the mass is not being subjected to acceleration. In that regard, it will be understood that when the mass 18 moves along a Z axis (into the paper as viewed in FIGS. 4 and 5), the mass sensors 26.4, 26.3, 26.7 and 26.8 on top of the member 14 are placed in compression to produce one change in resistance while the support sensors 26.1, 26.2, 26.6 and 26.5 on top of the member are placed in tension to produce an opposite change in resistance, accordingly, the pair of sensors in the first and third legs of the circuit are placed in tension while the sensors in the second and fourth circuit legs are in compression as indicated by T and C in FIG. 4A, thereby to produce a substantial output voltage across the output terminals 32 that output being representative of the degrees of acceleration, larger acceleration producing a greater output signal. On the other hand, where the mass 18 is subjected to acceleration forces off-axis in an X direction perpendicular to the Z axis as indicated in FIGS. 4B and 5, either along or in conjunction with Z axis movement, the pair of sensors in the first and second legs are placed in tension while the pair of sensors in the third and fourth legs are placed in compression. In that situation, where the sensors are precisely balanced by use of the tapered beam sections as provided in the invention, the applied voltage $V_B$ produces no increment of output voltage across the output terminals 32 which is attributable to that X axis acceleration. That is, the four legs of the circuit cooperate in compensating for X axis acceleration forces. On the other hand where the mass 18 is subjected to acceleration forces off-axis in a Y direction perpendicular to the Z and X axes, as indicated in FIGS. 4C and 5, the pair of sensors in each leg of the circuit are placed in tension and compression respectively so that the applied voltage produces no increment of output voltage at the terminals 32 which is attributable to that Y axis acceleration. That is, the sensors in each leg of the circuit cooperate with each other to individually compensate within each leg for Y axis acceleration of the mass. In that way the circuit arrangement for the sensors achieves high device performance and sensitivity while the interconnection pattern is easily and accurately achieved and compactly accommodated in the device.

It should be understood that although particular embodiments of the invention are described by way of illustrating the invention, the invention includes all modifications and equivalents of the disclosed embodiments falling within the scope of the appended claims.

We claim:

1. An accelerometer device comprising a member having a support, a mass, at least one beam mounting the mass on the support for movement relative to the support in response to acceleration, and means to sense strain in the beam during movement of the mass to provide an output signal corresponding to the acceleration, the beam having an end secured to the support and an end secured to the mass and having two tapered beam sections which have tapers which extend from the wider parts of the beam adjacent respective ends of the beam to narrower central parts of the beam, said two tapered beam sections containing said sensor means and being selected to provide substantially uniform strain along a section of the beam between the support and mass in response to selected device acceleration to enhance device response to the acceleration force.

2. An accelerometer device according to claim 1 wherein said sensor means comprises piezoresistive means having a selected length and being fully accommodated within that uniform strain section.

3. An accelerometer device according to claim 2 wherein the beam taper is selected to provide the substantially uniform strain in a beam section extending from one beam end to a central beam location.

4. A silicon accelerometer device comprising a silicon semiconductor member having a support, a mass, and at least one integral beam extending between the support and mass mounting the mass for movement in response to acceleration, and piezoresistive means accommodated in material of the beam for sensing strain in the beam during movement of the mass to provide an output signal corresponding to the acceleration, the beam having an end secured to the support and an end secured to the mass and having two tapered beam sections intermediate the beam ends selected to provide substantially uniform strain in the beam material in the tapered beam sections during the acceleration, the piezoresistive means being accommodated in the tapered beam sections to be responsive to that uniform strain.

5. A silicon accelerometer device according to claim 4 having a plurality of integral beams extending between the support and mass mounting the mass for movement in response to acceleration, having a pair of the tapered beam sections in each beam, and having a plurality of the piezoresistive sensor means, the piezoresistive means being provided in the respective tapered beam sections for sensing strain in the respective tapered beam sections during movement of the mass to cooperate in providing the output signal, each of the beams having an end secured to the support and an end secured to the mass, having a width at each beam end selected to be subject to high strain at the end of the beam, and having a relatively lesser width at a central portion of the beam to provide the pairs of tapered beam sections in the beam having substantially uniform strain throughout the sections during device acceleration.

6. A silicon accelerometer device according to claim 4 wherein each piezoresistive sensor means is fully accommodated within a tapered beam section to facilitate device manufacture with uniform properties.

7. An accelerometer device comprising a semiconductor member having a support, a mass, and two pairs of integral beams extending from the mass to the support at respective opposite ends of the mass mounting the mass for movement in response to acceleration, each beam having a section at each beam end tapered to provide substantially uniform strain along the tapered beam section during movement of the mass, four mass piezoresistive sensors accommodated in material of the respective beams within respective tapered beam sections adjacent to the mass to be responsive to the uniform strain therein during movement of the mass, four support piezoresistive sensors accommodated in material of the respective beams within respective tapered beam sections adjacent the support to be responsive to the uniform strain therein during movement of the mass, a pair of output terminals, a pair of input terminals, and conductor means interconnecting the piezoresistive sensors and terminals to receive a power input and to provide an output signal corresponding to movement of the mass along a first axis, the sensors being interconnected to respond to the uniform strain in the tapered beam sections to compensate for movement of the mass along second and third axes perpendicular to the first axis to provide an output signal corresponding to first axis movement of the mass.

8. A silicon accelerometer device according to claim 7 wherein the piezoresistive sensors are connected in a four-leg bridge circuit having a pair of the piezoresistive sensors arranged in each leg of the circuit, the pair of sensors in each leg of the circuit cooperating to compensate for movement of the mass along the second axis, and the sensors in the four legs of the bridge circuit cooperating to compensate for movement of the mass along the third axis.

9. A silicon accelerometer according to claim 8 wherein the support sensors have support ends adjacent the support and inner ends adjacent central beam portions, the mass sensors have mass ends adjacent the mass and inner ends adjacent central portions of the beams, the inner ends of the mass and support sensors on a pair of beams at one end of the mass are connected to each other and to a respective output terminal by respective conductor means, the mass ends of mass sensors at the one end of the mass are connected to respective mass ends of corresponding mass sensors at an opposite end of the mass by respective conductor means, support ends of the support sensors at the one end of the mass are connected to inner ends of corresponding support sensors at the opposite end of the mass by respective conductor means extending along respective sides of the mass, and respective conductor means connect inner ends of the mass sensors on one of the two beams at the opposite end of the mass to support ends of the support sensors on the other of the two beams at the opposite mass end, the latter conductor means also being connected to the respective input terminals.

10. An accelerometer device comprising a semiconductor member having a support, a mass and two pairs of integral beams with two tapered beam sections extending from the mass to the support at respective opposite ends of the mass mounting the mass for movement in response to acceleration, four mass piezoresistive sensors are accommodated in material of the respective beams adjacent to the mass to be responsive to strain therein during movement of the mass, four support piezoresistive sensors are accommodated in material of the respective beams adjacent the support to be responsive to the strain therein during movement of the mass, a pair of output terminals, a pair of input terminals, and conductor means interconnecting the piezoresistive sensors and terminals in a four leg bridge circuit to receive a power input and to provide an output signal corresponding to movement of the mass along a first axis, a pair of the piezoresistive sensors being arranged in each leg of the bridge circuit for cooperating with each other in compensating for movement of the mass along a second axis perpendicular to the first axis, and the piezoresistive sensors in the four legs of the bridge circuit cooperating with each other to compensate for movement of the mass along a third axis perpendicular to the first and second axes.

11. A silicon accelerometer according to claim 10 wherein the support sensors have support ends adjacent the support and inner ends adjacent central beam portions, the mass sensors have mass ends adjacent the mass and inner ends adjacent central portions of the beams, the inner ends of the mass and support sensors on a pair of the beams at one end of the mass are connected to each other and to a respective output terminal by respective conductor means, the mass ends of mass sensors at the one end of the mass are connected to respective mass ends of corresponding mass sensors at an opposite end of the mass by respective conductor means, support ends of the support sensors at the one end of the mass are connected to inner ends of corresponding support sensors at the opposite end of the mass by respective conductor means extending along respective sides of the mass, and respective conductors means connect inner ends of the mass sensors on one of the two beams at the opposite end of the mass to support ends of the support sensors on the other of the two beams at the opposite mass end, the latter conductor means also being connected to the respective input terminals.

* * * * *